(12) United States Patent
Dhand et al.

(10) Patent No.: US 10,057,372 B2
(45) Date of Patent: Aug. 21, 2018

(54) RESOURCE RECOMMENDATION, REUSE AND OPTIMIZATION THROUGH COMMON CONTEXT

(71) Applicant: International Business Machines Corporation, Armonk, NY (US)

(72) Inventors: Harsh Dhand, Bangalore (IN); Anubha Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/218,950

(22) Filed: Jul. 25, 2016

(65) Prior Publication Data
US 2016/0337471 A1 Nov. 17, 2016

Related U.S. Application Data

(63) Continuation of application No. 14/169,888, filed on Jan. 31, 2014, now Pat. No. 9,401,971.

(51) Int. Cl.
*G06F 15/16* (2006.01)
*H04L 29/08* (2006.01)
*H04L 12/26* (2006.01)

(52) U.S. Cl.
CPC .......... *H04L 67/325* (2013.01); *H04L 43/106* (2013.01); *H04L 67/10* (2013.01);
(Continued)

(58) Field of Classification Search
None
See application file for complete search history.

(56) References Cited

U.S. PATENT DOCUMENTS 7,188,150 B2 3/2007 Grueneberg et al.
7,305,375 B2 12/2007 Cioccarelli
(Continued)

FOREIGN PATENT DOCUMENTS

WO WO2001039008 A1 5/2001
WO WO2008008778 A2 1/2008
WO WO2012071384 A2 5/2012

OTHER PUBLICATIONS

Yu, Xuedou, "Design and Implementation of Search Engine on Distributed Network Resources," 2nd International Conference on Networking and Digital Society (ICNDS), May 30-31, 2010, pp. 577-579, Wenzhou, China, IEEE Digital Library.
(Continued)

*Primary Examiner* — Brian Whipple
(74) *Attorney, Agent, or Firm* — Ference & Associates LLC

(57) ABSTRACT

Methods and arrangements for managing resource requests. A contemplated method includes: receiving a new resource request from a user in a network; receiving at least one competing resource request; consulting cached historical resource requests; comparing the new resource request to the cached historical resource requests and the at least one competing resource request; fulfilling the new resource request via offering use of a resource corresponding to one of the historical resource requests; and fulfilling the at least one competing resource request in consideration of at least one aspect of the new resource request. Other variants and embodiments are broadly contemplated herein.

19 Claims, 3 Drawing Sheets

(52) U.S. Cl.
CPC .......... *H04L 67/22* (2013.01); *H04L 67/2842* (2013.01); *H04L 67/306* (2013.01); *H04L 67/327* (2013.01); *H04L 67/1002* (2013.01); *H04L 67/32* (2013.01)

(56) References Cited

U.S. PATENT DOCUMENTS

| | | | |
|---|---|---|---|
| 7,822,733 | B2 | 10/2010 | Son |
| 2005/0114538 | A1* | 5/2005 | Rose ............... H04L 29/06 709/231 |
| 2005/0198200 | A1* | 9/2005 | Subramanian ......... H04L 41/50 709/218 |
| 2008/0189261 | A1 | 8/2008 | Andreev et al. |
| 2008/0306797 | A1 | 12/2008 | Fayaz et al. |
| 2009/0265205 | A1 | 10/2009 | Stinchcombe et al. |
| 2013/0238745 | A1* | 9/2013 | Ramachandran .. H04N 21/2396 709/217 |
| 2013/0254333 | A1* | 9/2013 | Lyon ................ H04N 21/2385 709/217 |
| 2015/0026757 | A1* | 1/2015 | Reddy ................ H04L 63/20 726/1 |

OTHER PUBLICATIONS

Gupta, Alok, "Managing computing resources in intranets: an electronic commerce perspective,", Decision Support Systems, Nov. 1998, pp. 55-69, vol. 24, No. 1, Elsevier Science B.V., Amsterdam, Netherlands.

* cited by examiner

RESOURCE RECOMMENDATION, REUSE AND OPTIMIZATION THROUGH COMMON CONTEXT

CROSS REFERENCE TO RELATED APPLICATIONS

This application is a continuation application of U.S. patent application Ser. No. 14/169,888, filed on Jan. 31, 2014, and entitled "RESOURCE RECOMMENDATION, REUSE AND OPTIMIZATION THROUGH COMMON CONTEXT," the contents of which are incorporated by reference herein.

BACKGROUND

Generally, as organizations are growing larger, especially across teams and geographies, it is often the case that different people put in requests for similar resources and information at different points of time. While resource requests can include those relating to printer or copier use (among other things), even information requests also ultimately represent a form of resource requests (e.g., in that every keyword search takes up bandwidth).

Outside of costs, it is often the case that resource requests also carry environmental implications, e.g., in the case of printing the same document by multiple people. Thus, a lack of appreciation of context usually results in similar or duplicate resource requests needlessly being made. However, it is normally infeasible for everyone in an organization (or portion thereof) to have access to direct knowledge of everything that their peers might be requesting.

BRIEF SUMMARY

In summary, one aspect of the invention provides a method of managing resource requests, the method comprising: receiving a new resource request from a user in a network; receiving at least one competing resource request; consulting cached historical resource requests; comparing the new resource request to the cached historical resource requests and the at least one competing resource request; fulfilling the new resource request via offering use of a resource corresponding to one of the historical resource requests; and fulfilling the at least one competing resource request in consideration of at least one aspect of the new resource request.

Another aspect of the invention provides an apparatus for managing resource requests, the apparatus comprising: at least one processor; and a computer readable storage medium having computer readable program code embodied therewith and executable by the at least one processor, the computer readable program code comprising: computer readable program code configured to receive a new resource request from a user in a network; computer readable program code configured to receive at least one competing resource request; computer readable program code configured to consult cached historical resource requests; computer readable program code configured to compare the new resource request to the cached historical resource requests and the at least one competing resource request; computer readable program code configured to fulfill the new resource request via offering use of a resource corresponding to one of the historical resource requests; and computer readable program code configured to fulfill the at least one competing resource request in consideration of at least one aspect of the new resource request.

An additional aspect of the invention provides a computer program product for managing resource requests, the computer program product comprising: a computer readable storage medium having computer readable program code embodied therewith, the computer readable program code comprising: computer readable program code configured to receive a new resource request from a user in a network; computer readable program code configured to receive at least one competing resource request; computer readable program code configured to consult cached historical resource requests; computer readable program code configured to compare the new resource request to the cached historical resource requests and the at least one competing resource request; computer readable program code configured to fulfill the new resource request via offering use of a resource corresponding to one of the historical resource requests; and computer readable program code configured to fulfill the at least one competing resource request in consideration of at least one aspect of the new resource request.

A further aspect of the invention provides a method comprising: caching historical resource requests; accommodating a new resource request; consulting at least one of: the historical resource requests and at least one competing resource request; comparing the new resource request to the at least one of: the historical resource requests and at least one competing resource request; and thereupon determining at least one of: whether to fulfill the new resource request via using a resource corresponding to one of the historical resource requests; and a manner of fulfilling the at least one competing resource request in consideration of at least one aspect of the new resource request.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
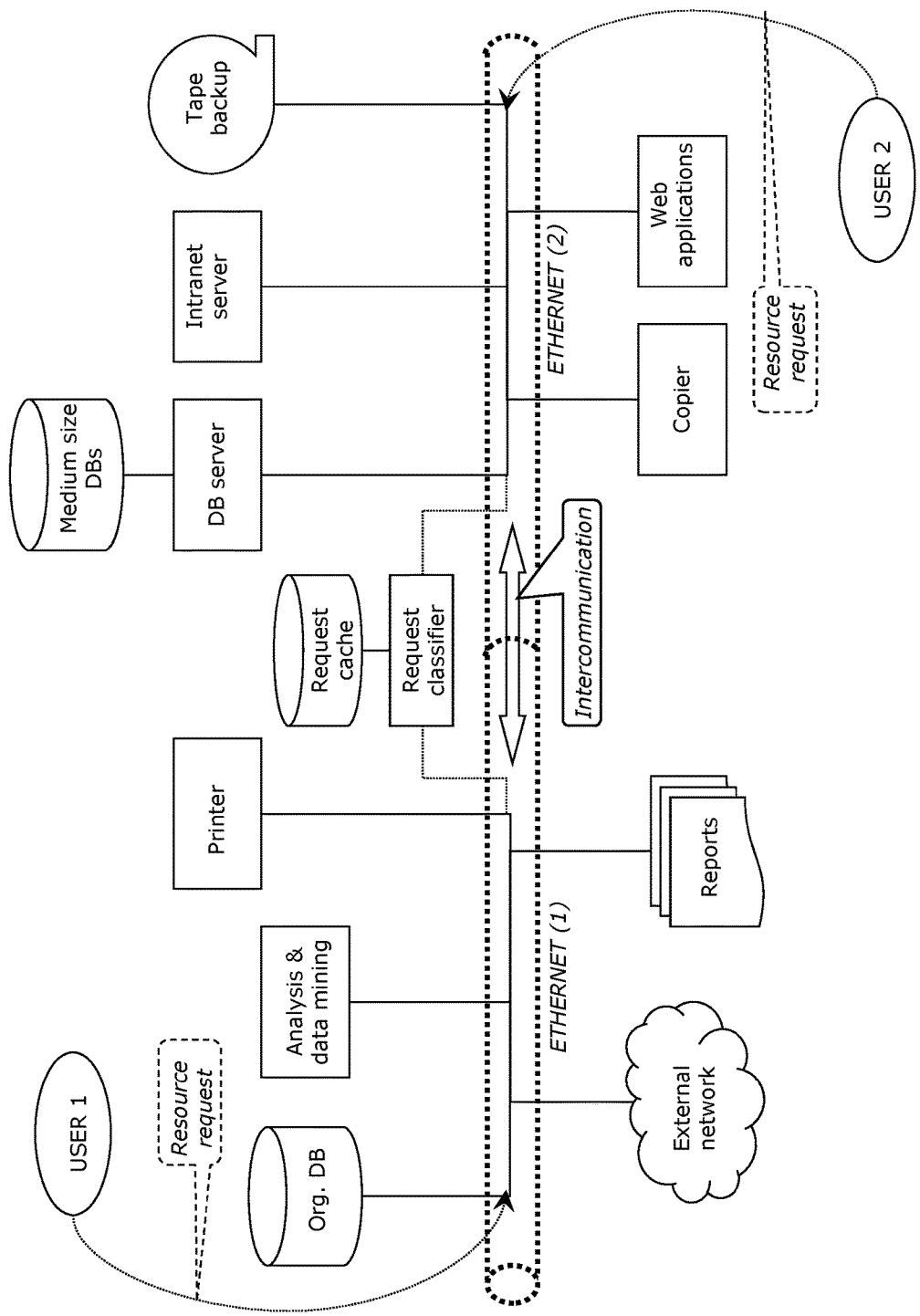
FIG. 1 schematically illustrates a system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made herebelow to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

Broadly addressed herein, in accordance with at least one embodiment of the invention, is a recognition that resource requests can generally be analyzed easily since they tend to travel first on an internal network (e.g., ethernet or intranet). Accordingly, broadly contemplated herein is a manner of resource optimization through a recognized shared context of employees or users requesting resources, which provides a capability to re-use and optimize resources. Also contemplated herein is a manner of predicting resource requests, to thereby provide shared resources pre-emptively so as to enhance general organizational effectiveness. Generally, methods and arrangements are broadly contemplated herein which effectively leverage an appreciation of context in resource requests, thereby taking advantage of aspects of an internal network of an organization in gathering and analyzing requests.

FIG. 1 schematically illustrates a system architecture, in accordance with at least one embodiment of the invention. As shown, an organizational ethernet may include two sectors (1) and (2), within which resource requests can be gathered, analyzed and fulfilled. It can be assumed that these two sectors are not normally in regular communication with one another, and operated as proverbial "silos", while broadly contemplated herein are methods and arrangements allowing for intercommunication between the two sectors in order to fulfill resource requests effectively from either sector. "Sectors" can even be defined on a person to person level, e.g., even if two users occupy the same literal sector as described above, they can be said to occupy different "silos", "sectors" or "sub-sectors" if they do not communicate anything about their resource requests to one another.

In accordance with an illustrative example in accordance with at least one embodiment of the invention, in the first sector (1), a user (User 1) can submit a resource request. A conventional request management system (for intranet/ethernet) can be used for this purpose. The request can be submitted for any of a great variety of possible resources such as, for example, printer use, downloading one or more reports or accessing information from an organizational database. Other resources that can be ordered or controlled via an intranet/ethernet include, by way of example, air conditioning and lighting. Some resources (such as searchable information) can be obtained from an external network, but it will be appreciated that in accordance with at least one embodiment herein such requests can become greatly reduced. While the discussion now proceeds by way of an example relative to two sectors as illustrated in FIG. 1, and as broadly defined hereabove, it should be understood that similar considerations can prevail in the case of two users who happen to occupy just one of the illustrated sectors (1) and (2) and yet who might not be in communication with one another with regard to resource requests.

In accordance with at least one embodiment of the invention, requests from User 1 and other users can be mined and analyzed, using advanced analytics in structured or unstructured domains. Such analytics may include, but need not be limited to, automatic mining of keywords from unstructured text, a search keyword recommendation system in the Internet (external network), clustering from unstructured data (e.g., blogs) to come up with common topics, prediction of user action using historical examples of actions or choices, and mining of social data to find trends or interests.

Additionally, in accordance with an illustrative example in accordance with at least one embodiment of the invention, in the second sector (2), a user (User 2) can also submit a resource request. Sources to fulfill such requests can include, e.g., a copier, tape backup, internally hosted web applications, an intranet server, and a database server in communication with medium-sized databases.

In accordance with at least one embodiment of the invention, a manner of intercommunication is provided between sectors of an intranet/ethernet that otherwise might be segregated, thus permitting resource requests to be fulfilled across an associated divide. Effectively, such intercommunication is inherently facilitated by way of a request classifier and request cache, to be described more fully below. This can help minimize any reliance on fulfilling requests from an external network that might otherwise need to be consulted or employed. This can also assist in accommodating common or similar requests, so that duplication can be avoided.

In accordance with at least one embodiment of the invention, by way of mining context and requests, other information and/or parameters can be employed in order to more efficiently fulfill user requests for resources. For instance, user context can be determined, e.g., from profile pages, team information and skill information, etc. Resource request mining can further include (but by no means need to be limited to): downloads (e.g., name of the file/document/common URL accessed); prints (name of the document); and search data (e.g., keyword matching and clustering).

In accordance with at least one embodiment of the invention, every resource request is fed through a classifier which maintains previous (historical) requests occurring in a cached manner. The caching mechanism could depend on storage, age, importance, reuse of requests, etc. Classification of requests could be generic (e.g., shared by default, such as search) or specific (e.g., shared optionally, such as printing). Further requests could be tagged as anonymous or tagged with identity (which itself could actually further enable collaboration). Requests could be time-deferred, e.g., sharing could become active after some elapsed time as set by a first user. For "near requests", which are "similar" but not necessarily the same, they still could be re-used. A user could be given the option to reuse from existing requests; to encourage this, a part of the company cost savings can be passed to employee as "green points".

Figure 2:
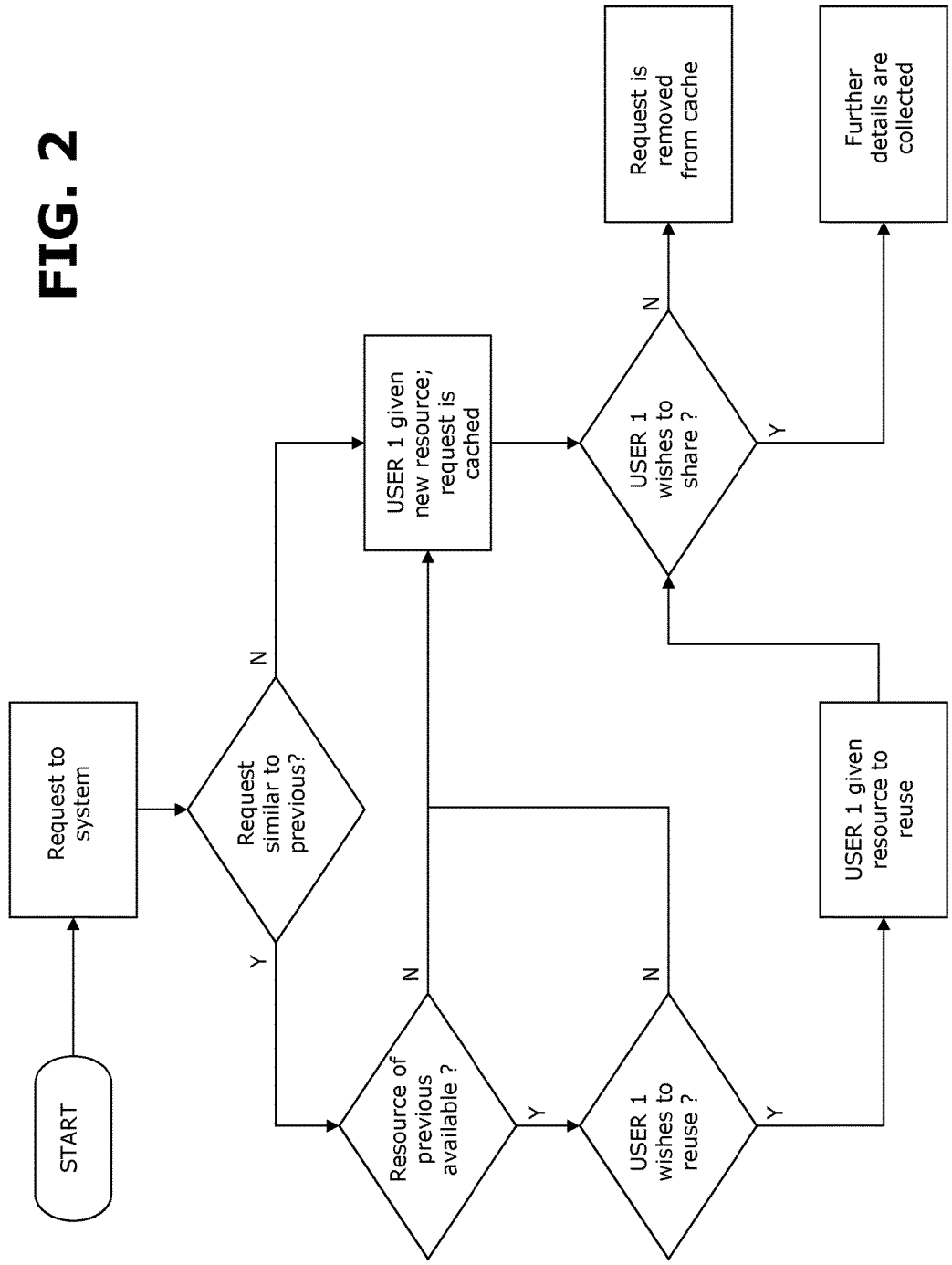
FIG. 2 sets forth a process of effecting resource requests.

FIG. 2 sets forth a process of effecting resource requests, in accordance with at least one embodiment of the invention. As shown, a user (User 1, by way of an illustrative example) effects a resource request to the system with which he or she is connected (e.g., a request handling system associated with an intranet/ethernet). If the request is determined to be similar to a previous one, a check is made as to whether the resource associated with that previous request is available. If yes, then User 1 is queried as to whether he/she wishes to reuse that resource. If yes, then he/she is given the resource to reuse.

In accordance with at least one embodiment of the invention, User 1 is given a new resource for use, and the attendant request is cached if: his/her request is not determined to be similar to a previous one; a similar resource associated with a previous request is not available; or he/she does not wish to reuse any such resource that may be available. Whether the user makes use of a new or reused resource, he/she is then queried as to whether he/she wishes to share the new or reused resource. If yes, then further details are collected, otherwise the request is removed from the cache. Such details can include, but need not be limited to, when a user might wish to share the resource and for how long, as well as other possible restrictions on sharing (e.g., via restricting any sharing to a certain team or group of people).

In accordance with at least one embodiment of the invention, when resources are to be shared, a timestamp can be applied at the time of first use of a resource and also at times when subsequent requests are made for the same resource by one or more other users. Broadly, such scenarios may be referred to as ones where there is an initial new resource request and also at least one "competing" resource request. A "competing" resource request may be received at essentially the same time as the initial new resource request, or at another time. As such, multiple use of resources (or use by multiple entities) can be facilitated, e.g., synchronized, by ensuring that a resource is provided to one or more additional users only once it is available for use. Such timestamps can be leveraged in essentially any suitable manner to promote efficient use. For instance, a hierarchy or order of use can be imposed on one or more additional users based on timestamps recorded for resource requests. Further calculations or determinations can be engendered by imposing a time limit on using a resource.

In a "recommendation" scenario, in accordance with at least one embodiment of the invention, a first user (e.g., User 1) can build a user request profile. This can represent, among other things, an inventory of resource requests that a user has made over a recent time period. For instance, the user could be an engineer on a given team, and the user request profile might indicate that he/she recently looked at particular articles in a trade publication. An engine, e.g., as may be associated with the request classifier and cache shown in FIG. 1, can then recommend resources to the user at a given time, based on a pattern of requests discerned from the saved user request profile.

In accordance with at least one embodiment of the invention, the aforementioned recommendations can be sent out to the user at predetermined fixed times or time intervals, or could be triggered by a given action. In the latter scenario, for instance, a user could make a request at a particular time and then, at a future time, the engine could send out a recommendation to the user before he/she makes another request. By way of an illustrative example, the engine could discern a pattern of requests for (online) magazine articles wherein it is determined that on average the user is requesting such articles once every two days. After an nth request is made for articles from one magazine, the engine could thus be prompted to send out a recommendation to the user for another article.

In accordance with at least one embodiment of the invention, in a "collaboration" scenario, a resource request profile of a first user can provide recommendations to a second user, or inform the development or amending of a resource request profile of that second user. Particularly, to the extent that the aforementioned engine may discern resource request patterns for a first user, it may issue recommendations directly to a second user or feed information to the resource request profile of the second user to assist in the development of that profile.

In accordance with at least one variant embodiment of the invention, "resource requests" as described herein can alternatively be embodied by what may be considered to be "infrastructure requests". By way of an illustrative and non-restrictive example, this could include what is commonly known as "IT tickets" (information technology tickets), which represent requests to attend to fixing an IT-related problem. Analysis and processing of such tickets can take place in a manner similar to the analysis and processing of resource requests otherwise described herein.

Figure 3:
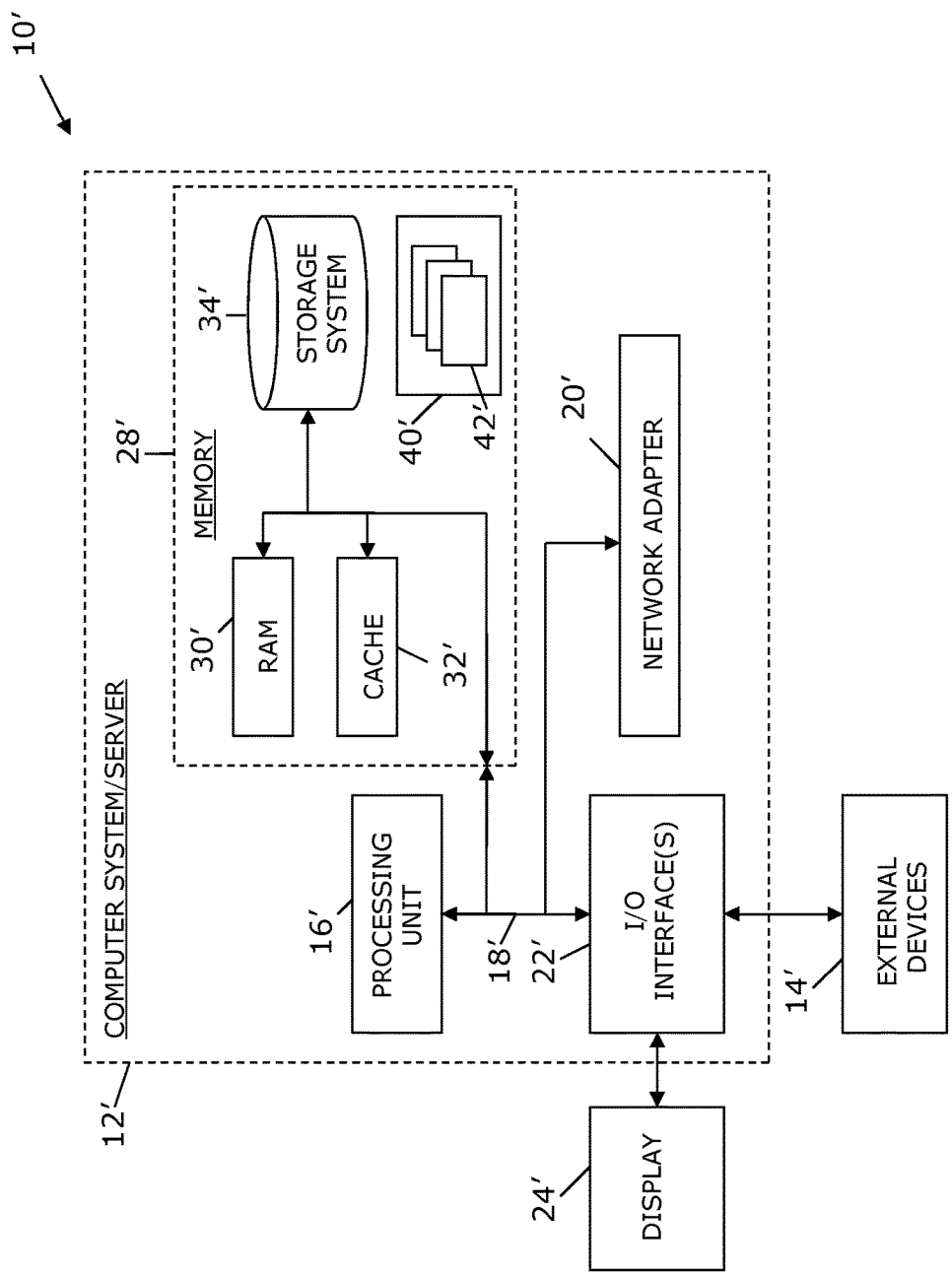
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing resource requests, said method comprising:
   receiving a new resource request from a user in an intranet network;
   receiving at least one competing resource request;
   consulting cached historical resource requests;
   comparing the new resource request to the cached historical resource requests and the at least one competing resource request;
   fulfilling, without accessing an external network, the new resource request via offering use of a resource corresponding to one of the historical resource requests; and
   fulfilling the at least one competing resource request in consideration of at least one aspect of the new resource request.

2. The method according to claim 1, comprising classifying the new resource request as either a generic request or a specific request.

3. The method according to claim 1, comprising at least one of: tagging the new resource request as anonymous and applying information identifying the user associated with the new resource request.

4. The method according to claim 1, comprising deferring fulfillment of the new resource request by a determined time interval.

5. The method according to claim 1, wherein said comparing comprises determining whether the new resource request is the same as one of the historical resource requests.

6. The method according to claim 1, wherein said comparing comprises determining whether the new resource request is similar to one of the historical resource requests.

7. The method according to claim 6, wherein said fulfilling of the new resource request comprises reusing a resource corresponding to one of the historical resource requests.

8. The method according to claim 1, wherein said fulfilling of the new resource request comprises offering an option to reuse a resource corresponding to one of the historical resource requests.

9. The method according to claim 1, wherein said fulfilling of the new resource request comprises:
   discerning a pattern of historical resource requests relative to the user; and
   automatically recommending a resource to the user based on the discerned historical pattern.

10. The method according to claim 9, comprising:
    developing a profile for the user, the profile comprising historical resource requests of the first user;
    wherein said discerning comprises consulting the profile of the first user.

11. The method according to claim 1, wherein the user comprises a first user, and said fulfilling of the at least one competing resource request comprises:

discerning a pattern of historical resource requests relative to the first user; and automatically recommending a resource to a second user based on the discerned historical pattern of the first user.

12. The method according to claim 10, comprising:

developing a profile for the first user, the profile comprising historical resource requests of the first user; and developing a profile for the second user, the profile comprising historical resource requests of the second user;

wherein said discerning comprises consulting the profile of the first user; and said recommending comprises updating the profile of the second user.

13. The method according to claim 1, comprising:

timestamping the new resource request;

the at least one competing resource request comprising a second request for the same resource as the new resource request;

timestamping the second request; and said fulfilling of the at least one competing resource request comprising fulfilling the new resource request and the second request in chronological order based on the timestamp of the new resource request as compared to the timestamp of the second request.

14. An apparatus for managing resource requests, said apparatus comprising:

at least one processor; and a computer readable storage medium having computer readable program code embodied therewith and executable by the at least one processor, the computer readable program code comprising:

computer readable program code configured to receive a new resource request from a user in an intranet network;

computer readable program code configured to receive at least one competing resource request;

computer readable program code configured to consult cached historical resource requests;

computer readable program code configured to compare the new resource request to the cached historical resource requests and the at least one competing resource request;

computer readable program code configured to fulfill, without accessing an external network, the new resource request via offering use of a resource corresponding to one of the historical resource requests; and computer readable program code configured to fulfill the at least one competing resource request in consideration of at least one aspect of the new resource request.

15. A computer program product for managing resource requests, said computer program product comprising:

a computer readable storage medium having computer readable program code embodied therewith, the computer readable program code comprising:

computer readable program code configured to receive a new resource request from a user in an intranet network;

computer readable program code configured to receive at least one competing resource request;

computer readable program code configured to consult cached historical resource requests;

computer readable program code configured to compare the new resource request to the cached historical resource requests and the at least one competing resource request;

computer readable program code configured to fulfill, without accessing an external network, the new resource request via offering use of a resource corresponding to one of the historical resource requests; and computer readable program code configured to fulfill the at least one competing resource request in consideration of at least one aspect of the new resource request.

16. The computer program product according to claim 15, wherein said computer readable program code is configured to determine whether the new resource request is the same as one of the historical resource requests.

17. The computer program product according to claim 15, wherein said computer readable program code is configured to determine whether the new resource request is similar to one of the historical resource requests.

18. The computer program product according to claim 17, wherein fulfilling of the new resource request comprises reusing a resource corresponding to one of the historical resource requests.

19. The computer program product according to claim 15, wherein said computer readable program code is configured to offer an option to reuse a resource corresponding to one of the historical resource requests.

* * * * *